Sept. 23, 1930.    J. R. GILPIN    1,776,500
DOWEL PIN AND MORTISE LOCK
Filed April 9, 1930

INVENTOR
James R. Gilpin
BY
his ATTORNEY

Patented Sept. 23, 1930

1,776,500

UNITED STATES PATENT OFFICE

JAMES R. GILPIN, OF ROCHESTER, NEW YORK

DOWEL PIN AND MORTISE LOCK

Application filed April 9, 1930. Serial No. 442,959.

My present invention relates to woodworking and more particularly to metallic devices for the purpose of locking dowel pins, tenons and the like in mortise joints, such as the rungs of chairs, ladders, et cetera, and it has for its object to provide a device of this character so simple that it can be produced at small cost and which, however, will be most effective and efficient in use.

To these and other ends the invention resides in certain improvements and combinations of parts, all as will be hereinafter more fully described, the novel features being pointed out in the claims at the end of the specification.

In the drawings.

Similar reference numerals throughout the several views indicate the same parts.

A difficulty that I found with prior locking devices of this character resides in the fact that the locking elements is driven into the walls of the socket or mortise in such a manner that it scores the side walls before it takes its final hold that its removal by a reverse force is facilitated. With my device, the locking element is not driven home until the instant that the dowel or tenon reaches its seat and then assumes an effective, perfectly transverse locking position.

Figure 1:
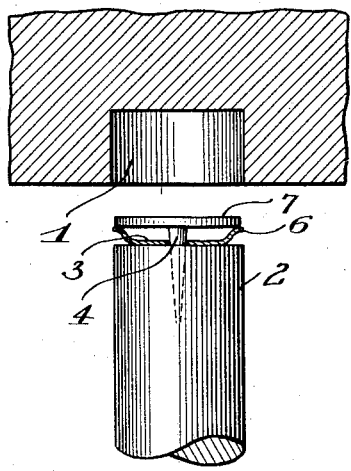
Fig. 1 is a collective view of a mortise and tenon or, specifically, a mortise and dowel pin with a fastener constructed in accordance with and illustrating one embodiment of my invention, in position on the tenon for the operation of driving it into its mortise or socket.
Figure 3:
Fig. 3 is a perspective view of the peg or nail portion of the fastener, inverted.
Figure 4:
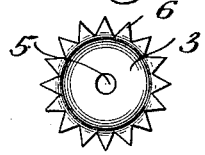
Fig. 4 is a plan view of the fastening element taken from that face which is placed against the end of the tenon or dowel.
Figure 5:
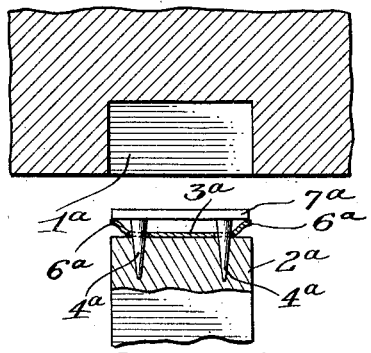
Fig. 5 is a view similar to Fig. 1, showing a modification of the invention as applied to a rectangular or other non-circular mortise joint.
Figure 6:
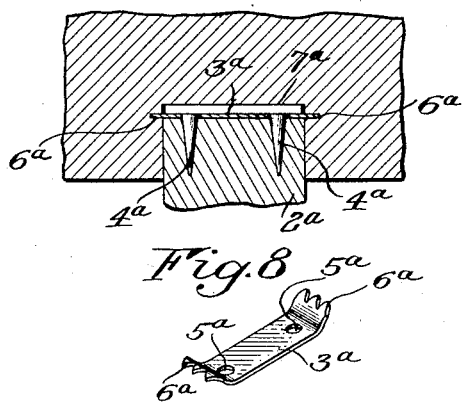
Fig. 6 is a view similar to Fig. 2 of the same modification.
Figure 8:
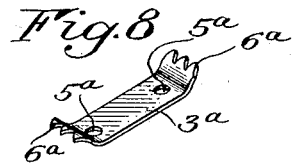
Fig. 8 is a detailed perspective of the locking element of the modification.
Figure 7:
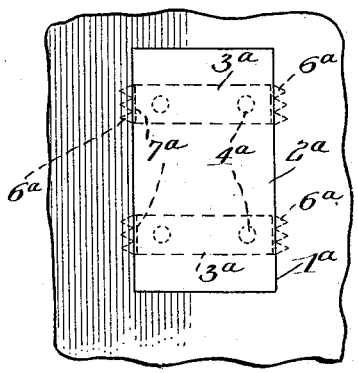
Fig. 7 is an end view of the joint of the modification after assembly.
Figure 9:
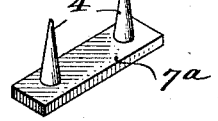
Fig. 9 is a detailed perspective of the peg or nailing element that cooperates with the latter.

Referring to the drawings in detail, 1 indicates a cylindrical mortise or dowel tenon receiving socket for the dowel 2. The fastening device consists, in this embodiment, of a cupped disk 3, shown in Fig. 4, and a peg or nail 4, shown in Fig. 3, adapted to extend through a central opening 5 in the disk. The edges of the disk 3 are serrated, as indicated at 6, providing sharp radial points. The convex side of the disk is placed against the end of the dowel 2. The overall diameter of the disk is then equal to the diameter of the dowel and of the socket, as clearly shown in Fig. 1. The peg 4 is then driven through the disk so that it lightly contacts therewith, as also shown in Fig. 1, and the head 7 thereof covers it practically to its very edge, being also approximately the diameter of the dowel and socket.

Figure 2:
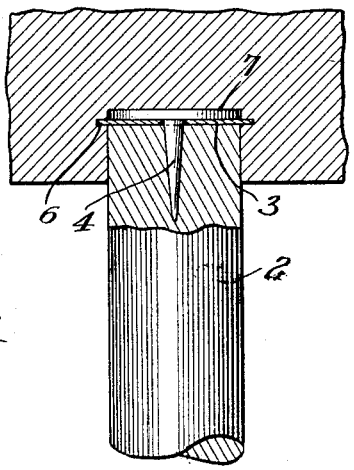
Fig. 2 is a similar view partly in section, showing the dowel driven into its socket and the fastener thereby expanded into operative position.

When the dowel is driven home, the effect shown in Fig. 2 is reached, that is, disk 3 is compressed between the end of the dowel and the nail head as the latter comes flatly against the bottom of the socket. The result is that the engaging points 6 are driven squarely laterally into the material of the socket or mortise 1 and become a strong and permanent lock.

With the modification shown in Figs. 5 to 9 inclusive, the mode of operation is the same except that a rectangular tenon $2^a$ is driven into a similarly formed mortise or socket $1^a$ and a metallic strap $3^a$ provided with openings $5^a$ takes the place of the disk 3. It has the locking prongs or serrations $6^a$ at its ends and is engaged by a double pronged peg $4^a$ fastening a rectangular head $7^a$ to flatten out the fastening element in the manner shown in Figs. 6 and 7.

I claim as my invention:

1. In a tenon locking device adapted to be driven into a mortise by the receiving tenon, the combination with a concave locking plate provided with anchoring prongs at its margins and having a central aperture, of a peg extending through the said aperture in the plate and adapted to be driven into the end of the tenon by the operation of driving the tenon into the mortise, said peg being provided with an enlarged head of approximately the diameter of the receiving tenon and bearing against the concave side of the locking plate so that the prongs on the locking plate will first make contact with the bottom of the mortise and will be spread laterally into the walls of the mortise at that point when the head of the peg is driven against the bottom of the mortise and flattens the locking plate.

2. In a tenon locking device, the combination with a mortise and a tenon adapted to be driven therein, of a concave locking plate provided with anchoring prongs at its margins and having a central aperture, said plate being disposed with its convex side against the end of the tenon, of a peg extending through the said aperture in the plate and driven into the end of the tenon, said peg being provided with an enlarged head of approximately the diameter of the tenon and of the mortise and bearing against the concave side of the locking plate, the prongs of the latter being spread laterally into the walls of the mortise by the pressure between the peg head and the end of the tenon as the result of the latter having been driven into the mortise.

JAMES R. GILPIN.